(12) United States Patent
Orshanskiy et al.

(10) Patent No.: US 8,584,012 B1
(45) Date of Patent: Nov. 12, 2013

(54) METHODS AND SYSTEMS FOR DISPLAYING TEXT ON A PATH

(75) Inventors: Sergey Orshanskiy, State College, PA (US); Andrei Burago, Kirkland, WA (US)

(73) Assignee: Adobe Systems Incorporated, San Jose, CA (US)

( * ) Notice: Subject to any disclaimer, the term of this patent is extended or adjusted under 35 U.S.C. 154(b) by 382 days.

(21) Appl. No.: 12/418,746

(22) Filed: Apr. 6, 2009

Related U.S. Application Data

(60) Provisional application No. 61/104,511, filed on Oct. 10, 2008.

(51) Int. Cl.
G06F 17/00 (2006.01)

(52) U.S. Cl.
USPC .............................. 715/264; 715/256; 715/263

(58) Field of Classification Search
USPC .......... 345/467, 441; 715/201, 210, 245, 264, 715/263; 717/117
See application file for complete search history.

(56) References Cited

U.S. PATENT DOCUMENTS

| | | | | |
|---|---|---|---|---|
| 5,539,868 | A * | 7/1996 | Hosoya et al. | 345/471 |
| 5,831,632 | A * | 11/1998 | Schuster et al. | 345/441 |
| 6,502,114 | B1 * | 12/2002 | Forcier | 715/273 |
| 6,803,913 | B1 * | 10/2004 | Fushiki et al. | 345/467 |
| 7,028,260 | B1 * | 4/2006 | Morsello | 715/210 |
| 7,036,075 | B2 * | 4/2006 | Walker | 715/201 |
| 7,120,900 | B2 * | 10/2006 | Atkin | 717/117 |
| 7,242,404 | B2 | 7/2007 | Burago et al. | |
| 7,310,771 | B2 | 12/2007 | Burago et al. | |
| 7,375,766 | B2 * | 5/2008 | Sakamoto | 348/569 |
| 7,385,612 | B1 * | 6/2008 | Peterson | 345/619 |
| 7,412,360 | B2 * | 8/2008 | Surazhsky et al. | 703/2 |
| 7,453,463 | B2 | 11/2008 | Burago et al. | |
| 7,472,340 | B2 | 12/2008 | Burago et al. | |
| 7,492,366 | B2 | 2/2009 | Burago et al. | |
| 7,506,255 | B1 * | 3/2009 | Feinberg et al. | 715/264 |
| 7,576,749 | B2 | 8/2009 | Burago et al. | |
| 7,698,637 | B2 | 4/2010 | Burago et al. | |
| 7,770,111 | B2 | 8/2010 | Burago et al. | |
| 7,831,908 | B2 * | 11/2010 | Danilo | 715/245 |
| 2004/0145592 | A1 * | 7/2004 | Twersky | 345/619 |
| 2006/0106593 | A1 * | 5/2006 | Schultz et al. | 704/5 |
| 2007/0211062 | A1 * | 9/2007 | Engelman et al. | 345/467 |
| 2008/0238927 | A1 * | 10/2008 | Mansfield | 345/467 |

OTHER PUBLICATIONS

Doug Felt, Reference Implementation of the Unicode 3.0 Bidi Algorithm, 1999, IBM Corp.*

(Continued)

*Primary Examiner* — Adam M Queler
*Assistant Examiner* — Howard Cortes
(74) *Attorney, Agent, or Firm* — Kilpatrick Townsend & Stockton LLP

(57) ABSTRACT

A computer system can include a processor with access to a computer-readable medium embodying program components and/or instructions to provide a text placement engine. The text placement engine can use one or more software routines or algorithms to position text on a path. For example the text placement engine may access text data to be placed on the path and path definition data defining the path as a line segment extending between a first and a second end of the path. The text data can specify the text as a plurality of glyphs. For example, each letter, space, punctuation symbol, or other unit of a string may correspond to a glyph.

23 Claims, 9 Drawing Sheets

(56) References Cited

OTHER PUBLICATIONS

Mark David, The Bidirectional Algorithm, Sep. 15, 2006, Unicode, Revision 17.*
Doug Felt, Reference Implemnetation of the Unicode 3.0 Bidi Algorithm, 1999, IBM Corp.*
Printing from Windows Notepad Using the Word Wrap Option, Jul. 2005, Microsoft.*
Mark David, Unicode Bidirectional Algorithm 5.0, Sep. 15, 2006, Unicode, Revision 17.*
Doug Felt, Reference Implementation of Unicode 3.0 Bidirectional Algorithm in Java, 1999, IBM Corp.*
Printing from Windows Notepad Using Word Wrap Option, Microsoft, Jul. 2005.*
Remove Extra Whitespace and/or Tab Tool, Feb. 2007, www.textfixer.com.*
Adobe Systems Incorporated, Adobe Illustrator CS3 Help, pp. i-vi, 297-300, entire document available at http://help.adobe.com/en_US/Illustrator/13.0/illustrator_cs3_help.pdf (last accessed Nov. 2, 2010).

* cited by examiner

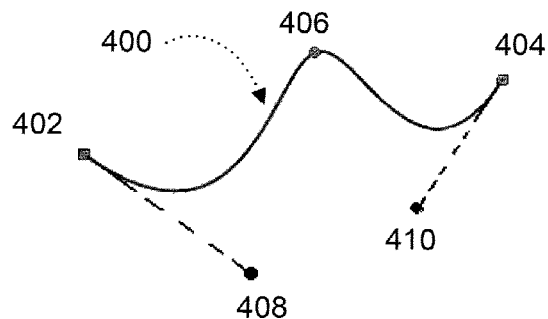
FIGURE 6A
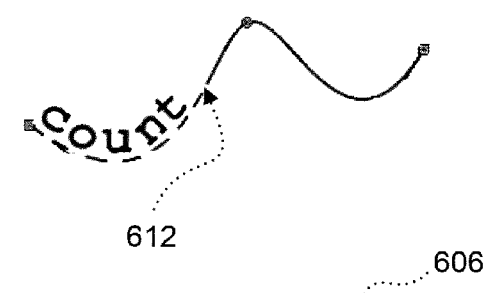
FIGURE 6B
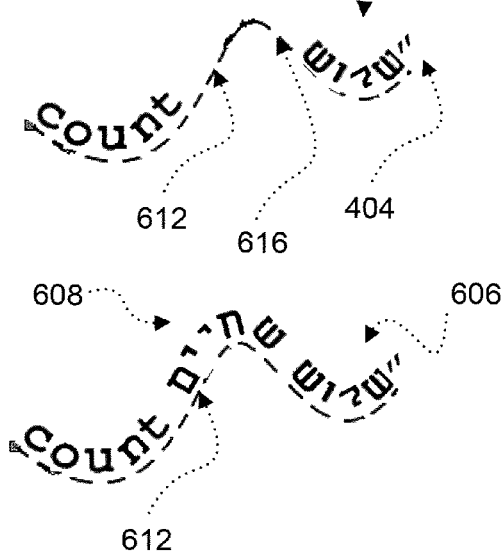
FIGURE 6C
FIGURE 6D

METHODS AND SYSTEMS FOR DISPLAYING TEXT ON A PATH

PRIORITY CLAIM

This application claims priority to U.S. Provisional Patent Application No. 61/104,511, filed Oct. 10, 2008, and entitled "Generalized Framework for Text On Path Features," which is incorporated by reference herein in its entirety.

TECHNICAL FIELD

Embodiments discussed herein relate generally to the field of data processing systems, particularly to systems and methods for placing text along a path.

BACKGROUND

Software tools may support rendering text on a path. For example, a designer may use a tool to place one or more text strings in a document or application so that the text follows a path. In order to do so, the software requires one or more suitable algorithms, processes, or components that, given a text and a path, are able to place the text on the path in a visually acceptable manner.

Although existing software applications may provide some support for text on a path, the resulting text may not have an optimal appearance. Further, existing systems and methods may not support all possible types of text.

For example, the desired "text" may be bidirectional, may be written in a mixture of languages, may use a mixture of fonts and/or font sizes. The "text" may include other features such as TCY. TCY stands for Tate-Chu-Yoko and refers to a short horizontal run of text (usually a number) in some vertical Japanese text. As another example, "text' could include other images, such as "sniffles," logotypes, and animated images.

SUMMARY

A computer system can include a processor with access to a tangible computer-readable medium embodying program components and/or instructions to provide a text placement engine. The text placement engine can use one or more software routines or algorithms to position text on a path. For example, the text placement engine may access text data to be placed on the path and path definition data defining the path as a line segment extending between a first and second end of the path. The text data can specify the text as a plurality of glyphs. For example, each letter, space, punctuation symbol, or other unit of text may correspond to a glyph.

The glyphs can be placed on the path iteratively, beginning at one end of the path. Once a glyph is placed onto the path, the path can be truncated and the next glyph placed at the "new" end of the path. In some embodiments, placing glyphs on the path comprises associating a location with each glyph relative to the path. In some embodiments, after glyphs have been placed on the path, the glyphs can be rotated accordingly. For example, the glyphs may be rotated to be tangent to the path.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures:

FIGS. 6A-6G illustrate examples of positioning glyphs comprising bidirectional text on a path.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Some embodiments of the present subject matter comprise methods and systems for placing text on a path. For example, a computer application, program, or component can be configured to access data embodied in a computer-readable medium and defining a path. For example, the path may be a parameterized curve such as a Bezier curve; the terms "curve" and "path" are intended to be synonymous. Next, additional data embodied in a computer-readable medium can be accessed to determine the text to be placed on the path. Specifically, the text can be retrieved as a plurality of glyphs, such as letters, numbers, symbols, punctuation, or other individualized units.

Placement data specifying a position relative to the path for at least some of the glyphs can be generated by iteratively determining a placement point on the path for individual glyphs relative to the path. For example, iteratively determining a placement point on the path for individual glyphs can comprise, for each glyph, accessing the path and identifying a first end of the path, determining a path segment to be occupied by the glyph and extending from the first end of the path to a point on the path by a distance appropriate for a glyph size, associating the glyph with a point on the path segment, truncating the path by removing the path segment occupied by the glyph and returning the path as truncated, the returned path being the path accessed for the next glyph.

A placement point for an individual glyph can be determined unless/until the returned path as truncated is shorter than the distance appropriate to the size of the next glyph. At that point, suitable output can be provided to indicate that the desired text will not fit on the path. For example, an error message may be provided or the text can be indicated as truncated by ellipses ( . . . ) or another indicator.

Figure 1:
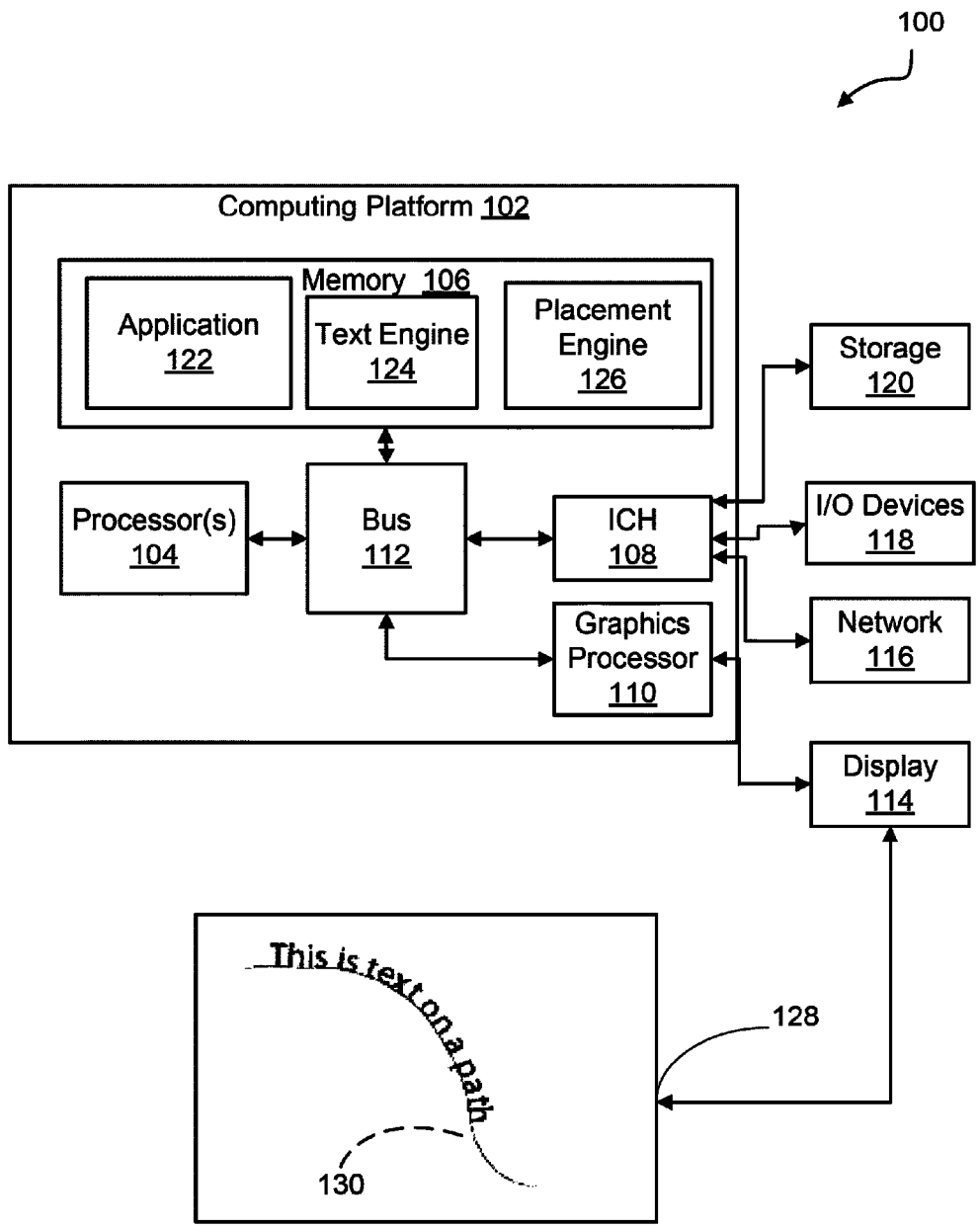
FIG. 1 shows an illustrative system for rendering text on a path.

FIG. 1 illustrates an exemplary system 100 comprising a computing platform 102 suitable for implementing embodiments of the methods and systems as described in the examples herein. The exemplary computing platform of FIG. 1 comprises: one or more processors 104; memory 106, representing one or more computer-readable media accessible by processor(s) 104 (e.g., processor cache, volatile memory such as DDR RAM, EDO RAM, etc, nonvolatile memory such as flash memory, etc.); an I/O control hub (ICH) 108; a graphics processor 110; and a bus 112. Graphics processor 110 is shown as connected to a display 114 of which different types exist such as Cathode Ray Tube (CRT), Thin Film Transistor (TFT), Liquid Crystal Display (LCD), DPL, etc. ICH 108 facilitates connection to various devices including a network interface component 116 (e.g., for connection to a local area network, wide area network, etc.); user I/O devices 118 (e.g., keyboard, touchpad, mouse, etc.); and storage 120 (e.g. additional computer-readable media such as a local or remote disk).

The one or more processors 104 execute instructions in order to perform software routines the computing system implements. The instructions frequently involve some sort of operation performed upon data. Memory 106 is deliberately made available to other components within the computing platform. For example, the data received from various interfaces to the computing system (e.g., keyboard and mouse, printer port, LAN port, modem port, etc.) or retrieved from an internal storage element of the computing system (e.g., hard disk drive) are often temporarily queued into memory 106 prior to their being operated upon by the one or more processor(s) 102 in the implementation of a software program. Similarly, data that a software program determines should be sent from the computing system to an outside entity through one of the computing system interfaces, or stored into an internal storage element, is often temporarily queued in memory 106 prior to its being transmitted or stored.

The ICH 108 is responsible for ensuring that such data is properly passed between the memory 106 and its appropriate corresponding computing system interface (and internal storage device if the computing system is so designed). Bus 112 serves to connect memory 106, processor(s) 104, ICH 108, graphics processor 110, and/or additional components of computing platform 102.

FIG. 1 further illustrates several exemplary program components embodied in memory 104. In this example, memory 104 embodies an application 122, a text engine 124, and a text placement engine 126. The program components may be embodied as data structures and/or instructions accessed and executed by processor 104, for example. Memory 104 may include additional components such as an operating system to coordinate operation of the computing platform and working files for development application 122, text engine 124, and/or text placement engine 126, and so it should be understood that this example is not meant to limit the present subject matter.

Application 122 may comprise one or more applications, processes, or components that are used to provide output to a user, such as a display of content, based on input and/or accessing stored data. For example application 122 may comprise a graphic editing/design application tool or package that provides a user the capability to define paths and input text for inclusion on the path. Examples of graphic design tools include, but are not limited to, ADOBE® PHOTOSHOP® and ILLUSTRATOR®, both available from Adobe Systems Incorporated of San Jose, Calif.

As another example, application 122 may comprise an application development tool, presentation authoring tool, or the like that displays content comprising text on a path. For instance, ADOBE® FLEX BUILDER™ may be used to develop FLASH® and/or AIR® applications including text on a path. As a particular example, a development tool may have a command to animate text along a Bezier curve, with the Bezier curve and text located by the application under development when executed, such as by accessing the current time or a feed of newspaper headlines. As another example, application 122 may be configured to access pre-defined text and a pre-defined path and then place the text on the path.

FIG. 1 includes an example 128 of output from display 114. In this example, the output includes text ("This is text on a path") on path 130. Text "on" a path may be positioned slightly above a path, intersecting with the path, or below a path. Thus, the term "on" a path is meant to signify that the text follows the path. For example, both the path and the text may be rendered in the display based on display coordinates. However, the present subject matter may be used to display text that follows a path when the path itself is not separately visible or displayed; that is, when the path exists only for the purpose of placing text. For example, a digital image may depict a car, and the path may be the contour of the car. The contour may be supplied manually by user input or may be detected automatically.

Software application 122 may, of course, store graphical output in a suitable computer-readable medium. If software application 122 is used for application development, then graphical output 128 may represent output generated by the application under development. For example, software application 122 may include code elements, libraries, and other components to allow the application under development to display text on a path in accordance with the present subject matter.

In this example, application 122 relies on an underlying text engine 124 to handle text objects. Text engine 124 may represent, for example, a software component having an API that manages text characteristics. For example, text engine 124 may manage the details of breaking lines or other units of text into individual glyphs, providing bidirectional embedding levels, and/or finding a valid place in the text for breaking a line if all of the text does not fit on the path. Other aspects that can be managed via text engine 124 include the desired font, font size, and other characteristics.

In some embodiments, text engine 124 is provided as part of application 122 or an execution framework for application 122. As an example, ActionScript™ is used in authoring applications for execution using ADOBE® FLASH®, available from Adobe Systems Incorporated of San Jose, Calif. The FLASH text engine may be used to control the behavior of text in the final application to be executed using a FLASH viewer.

A text placement engine 126 can use one or more text placement algorithms configured in accordance with the present subject matter to determine how to place text along a path. Placement engine may comprise a framework or family of algorithms in practice. In this example, text placement engine 126 is illustrated as a separate component from application 122 and text engine 124. It will be understood that text placement engine 126 could be incorporated into application 122, or could even be a feature of text engine 124 in certain embodiments.

Text placement engine 126 can use text engine 124 to obtain information about text of interest and can obtain information defining a path from user input provided to application 122 or by accessing predefined data available to application 122. Text placement engine 126 can then provide positioning information for the text of interest for use by application 122 (or other components) to display the glyphs comprising the text.

For instance, placement engine 126 may provide output including placement data such as coordinates for positioning glyphs relative to the path. As an example, in some embodiments, the placement data indicates a point on the path for each glyph and an angle for rotation of the glyph. The actual display position of the glyph can be determined based on the point for each glyph, such as by determining display coordinates for the glyph based on the coordinates of the point on the path, with the path itself defined relative to a display area.

The details of application 122 can vary according to its intended functionality. For example, application 122 may comprise a vector graphic editing application that places the text on a path as vector components. If application 122 comprises a bitmap editor, the text and path may be positioned based on data returned from placement engine 126 and then converted to bitmap form. If application 122 is a software application development tool, then the positioning data provided by placement engine 126 may be used in configuring graphic components included as part of an executable file or package output by the software application development tool and/or may be used to specify code elements controlling placement of the text in output generated by the application under development.

For example, an application may provide a user interface for specifying the path (e.g., by mouse gestures to select or define a path) and for identifying text to be placed on the path (e.g., by typing, pasting other text). As another example, a software developer may program a series of actions to be performed by an application, with the actions including (among other things) placing text on the path. For instance, the application may create a scrolling marquee that follows a path so that text seems to appear at one end of a path, travel the length of it, and then disappear at the other end.

Figure 2:
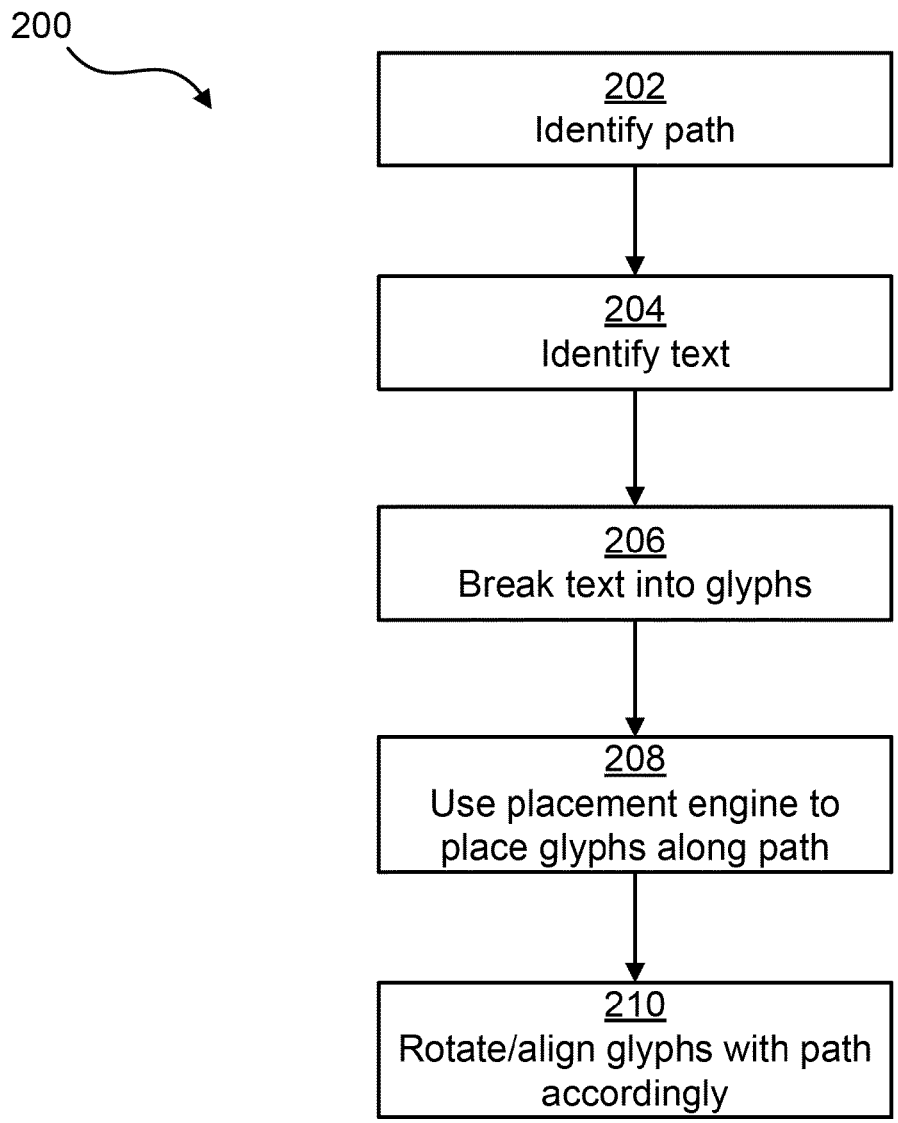
FIG. 2 is a flowchart showing an example of a method for rendering text on a path.

FIG. 2 is a flowchart illustrating a method 200 comprising exemplary steps for positioning text on a path in accordance with the present subject matter. At 202, a path is identified. The path may be continuous or discontinuous in some embodiments. A user of application 122 noted above may define a curve via a graphical user interface and indicate that text is to follow the path. If application 122 is to display text on a predefined path, then application 122 may access predefined data indicating the path. As an example, in some embodiments, a path can be defined as one or a sequence of Bezier curves, such as one or more cubic Bezier curves each defined by four specified points. As another example, a path can be defined/given as a parabola, a circle (specified by coefficients in an equation), or even a broken polygonal line specified by an array of points.

At block 204, the text is identified. For instance, in a graphic design application, the user may click on a canvas or a path previously placed on the canvas and specify the text of interest, along with text characteristics (e.g., font, font size, etc.). As another example, the text may have been stored previously and may be accessed by application 122 when it is time to display the text. Text data can include information defining the text along with other additional data, such as the desired orientation of the glyphs (e.g., sideways, upside-down, tangent to the path, rotated to a predetermined angle relative to the path tangent, etc.).

At 206, the text is broken into glyphs, i.e., individual units. Generally, a "glyph" is a visual unit that can be moved to any point and/or rotated by any suitable angle. For example, glyphs can include, but are not limited to, letters, numbers, spaces, punctuation, and symbols in a text string. At block 208, the glyphs are individually positioned at points along the defined path on a case-by-case basis, and at 210 the glyphs are rotated accordingly. Rotation can ensure that a specified side of each glyph is tangent to the path at which the glyph is positioned. The rotation may be adjusted accordingly to optimize the overall appearance of the text—for example, some glyphs may not be exactly tangent to the path in order to avoid nearby glyphs being rotated into one another.

In some implementations, a text engine 124 (such as FTE, the Flash Text Engine) can compose text on a straight line. It takes the length (width) allocated for the text on the line as a parameter and puts some number of glyphs there, adjusting the spacing and other things, as necessary. Certain previous TOP (Text On Path) algorithms take the path and compute its arc length. Then the text is composed on a straight line of the same length. In other words, the arc length of the path can be used as a parameter for the text engine. Sometimes this is referred to as "flattening the path," since, for positioning purposes, the path is replaced by its flattening—a straight line of the same length.

To place the glyphs along the path, each glyph's position on the straight line after the aforementioned composition can be used to find the corresponding position on the path. In this context, "corresponding" means that the arc length of the part of the path before the point where the text engine should place the letter is equal to the distance of the letter's position on the straight line from the beginning of the straight line. Lastly, the letters can be rotated—the easiest way is to rotate them along the tangents at the appropriate points of the path. In some embodiments, an appropriate point can refer to the center of the piece of the path assigned to the particular glyph.

In such implementations, one potential drawback is that the letters may be too sparse at convex parts (e.g., when writing on the outside of a circle or a curve) and too crowded on the concave parts (e.g., when writing on the inside of a circle or a curve). To address this shortcoming, text placement algorithms can take the curvature and convexity and concavity of the path into account. For example, certain algorithms may perform what is called curvature-based path remapping. Generally, they treat convex portions as longer and concave portions as shorter, with length increasing as a portion becomes more convex. The end result is that more glyphs are placed in convex portions and fewer glyphs are placed in concave portions.

For example, an algorithm may adjust the arc length by adding to it the integral of the signed curvature (total signed rotation of the unit tangent vector on a given part of the path) multiplied by a coefficient. "Adjusting the arc length" can comprise using a different number instead of the true arc length when calling the text engine and also when assigning glyphs to the corresponding points on portions of the curve. Then, it is still possible to only make a single (curvature-adjusted) call to the text engine and, after this single composition, map these glyphs back by using the generalized arc length (curvature-adjusted).

However, even curvature-adjusted mappings may be non-ideal. It may be advantageous to set the coefficients used to adjust arc length for a segment based on a specific glyph being placed. This approach may be inefficient and lead to performance issues because it requires multiple queries to the text engine instead of a single call for composing text on a straight line. Further complications arise when the tasks of centering or justifying the text on a path or placing bidirectional text on a path are considered.

In some embodiments, in addition to curvature-adjusted mappings, two primitives, placeLeft and placeRight, are used to formalize and develop the approach presented above. placeLeft places one glyph at the beginning of the path and allocates to it as much space as it requires based on factors including the glyph size (e.g. its height, or ascent, or other parameters) and the path. After that, placeLeft chops off ("truncates") the beginning of the path used by this glyph so that that part of the path is excluded from further consideration. placeRight places a glyph at an end of a path opposite to that end at which placeLeft places a glyph and works in the opposite direction, chopping off the path as glyphs are placed. Other factors that may be considered by placeLeft and placeRight include font type and size, direction, capitalization, and other semantic properties.

Advantageously, introduction of the primitives placeLeft and placeRight allows for a generalized framework in accordance with the present subject matter, so these functions (placeLeft and placeRight) can do something else rather than simply finding a prefix of appropriately generalized (curvature-adjusted) arc length, where the coefficient for taking the curvature into account is determined by the geometry of the glyph. In some embodiments, placeLeft and/or placeRight can be used to position some or all glyphs of a text string or other unit in a more flexible manner.

Figure 3:
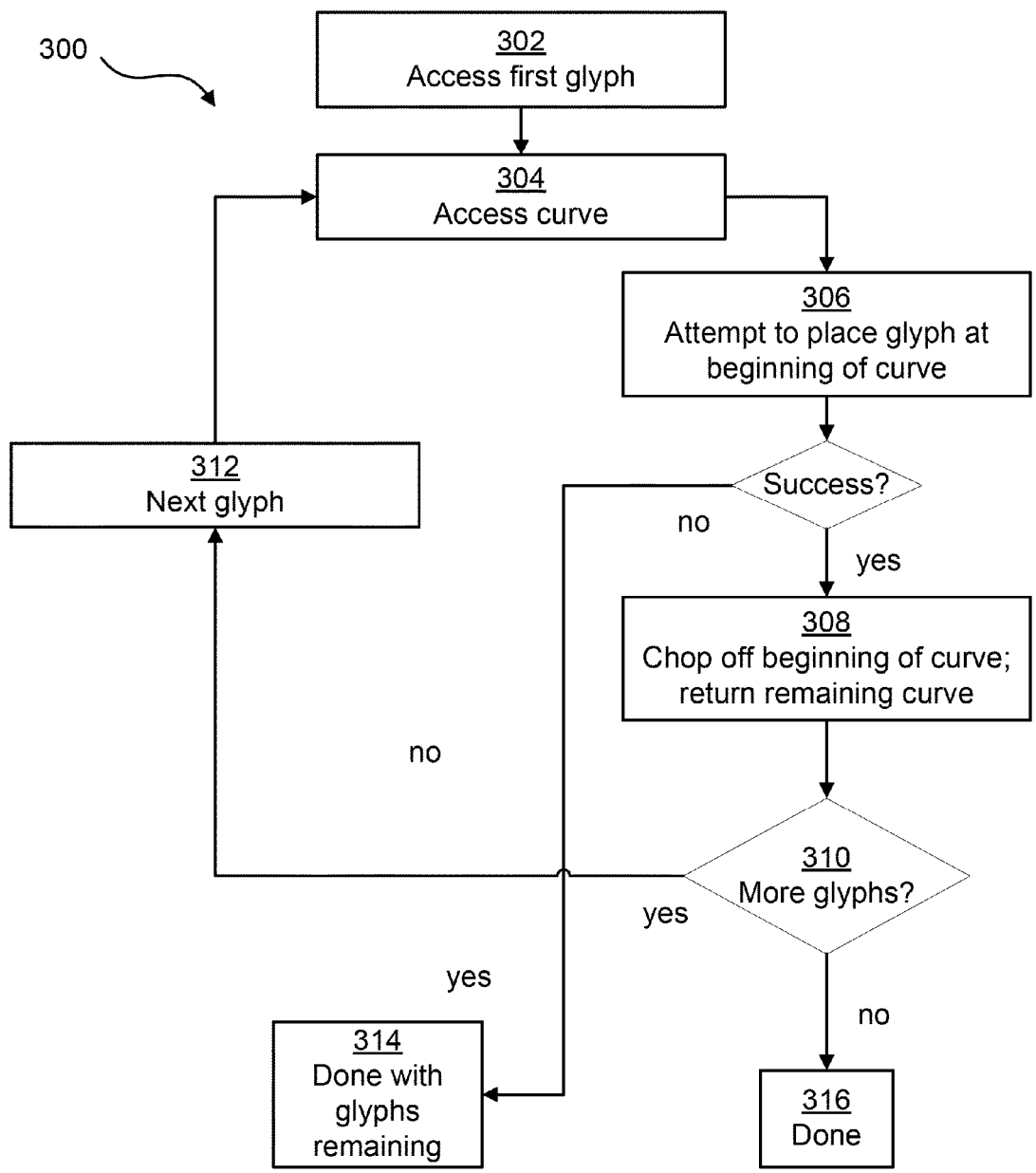
FIG. 3 is a flowchart illustrating an example of determining positions for glyphs on a path.

FIG. 3 illustrates an exemplary method 300 for positioning glyphs at points along the path. This approach can be implemented using two primitives, placeLeft( ) and placeRight( ) Primitive placeLeft (glyph, curve) takes a glyph (such as a letter) and a curve as arguments and places the glyph at the beginning of the curve. In the example below, a curve extends from a first point referred to as "the beginning" to a second point referred to as the "end" of the curve, although conceivably the curve could be a circle, an (approximated) ellipse, or other 'closed' form and thus the "ends" would be for purposes of reference only.

After the first glyph is placed, placeLeft truncates the beginning of the curve and returns the remaining curve. Similarly, if placeRight( ) is used, the glyph is placed at the end of the curve and the function returns whatever remains from the curve. These operations can use information representative of the space the glyph occupies, such as information about the size of the glyph as displayed, in order to determine how much of the path to chop off. This may be available from the text engine, for instance, and may reflect the actual dimension of the glyph or a stand-in value such as selection bounds for the glyph.

Glyphs may be obtained by call to the text engine for a text engine object (e.g., a paragraph) that returns a sequence of glyphs to be put on the curve. In some implementations, for handling bidirectional text and dealing with the issue of dropping glyphs when the curve is not long enough, the glyphs should be ordered in visual order (i.e. the order in which they should be written when looking from left to right) rather than in logical order (i.e. the order in which people are intended to read the glyphs).

This may be a relatively sophisticated problem that was typically handled by the text engine when the text-on-path algorithms called it only once to compose the text on a straight line. However, by introducing placeLeft and placeRight, issues are introduced with regard to bidirectional text that do not arise when a single call to the text engine is made. A text placement algorithm or portion thereof that addresses such issues will be referred to as a bidirectional text placement algorithm. Briefly, the text engine may provide the glyphs for individual placement in logical order (i.e., the order in which people are intended to read the glyphs) rather than visual order (i.e., the order in which the glyphs should be written when looking left to right). As will be discussed further below (See "Addressing Bidirectional Text Issues"), embodiments can include a suitable bidirectional text placement algorithm to ensure that bidirectional text is properly placed by the text placement engine. This can include recursion and multiple calls to placeLeft/placeRight for a single glyph.

FIG. 3 depicts use of placeLeft or placeRight on a path, and this process may occur as part of a bidirectional text placement algorithm designed to address the issue explained above. The process shown in FIG. 3 may be carried out to place text having a single direction as well. For a simple left-to-right text, the process corresponds to calling placeLeft on all letters consecutively to iteratively determine placement points for the glyphs until as many as possible are placed on the curve. Similarly, for right-to-left text, the same process is carried out, but starting from the opposite end of the curve and beginning with the rightmost glyph in the group (i.e., the first glyph in logical order).

At block 302, the first glyph (letter or otherwise) of a group of glyphs (e.g., a text string) is accessed. At 304, data defining the curve is accessed. For example, the curve definition may be provided by a component of application 122, while the glyphs are available via one or more calls to text engine 124. At block 306, the algorithm attempts to place the glyph at the beginning of the curve. That is, the placement engine identifies an end of the curve from which placement will start and attempts to associate the glyph with a portion of the curve extending from that end. The placement is considered successful if the text placement engine determines that the remaining portion of the curve is appropriate for the glyph (i.e., if the glyph fits on the portion of the curve available to occupy). For example, if placement is successful, a prefix of the curve may be associated with the glyph; however, the mechanics of associating the glyph with a portion of the curve may be implemented in any suitable manner. If placement is not successful, the method branches to 314, where the placement algorithm terminates with glyphs remaining.

In the case of successful placement, the method moves on to block 308. At block 308, the portion of the curve now occupied by the first glyph is "chopped off" and the remaining portion is returned for use with the next glyph. It should be understood that the original curve may be maintained elsewhere in memory and the "chopped off" version can comprise a working copy of the data defining the curve. As another example, the curve being chopped off can be emulated by storing the point on it until which it is considered to be chopped off (or two points, for chopping off from the beginning and from the end) and then working with this curve as if it were indeed chopped off. In some implementations, this may require storage of only two more real numbers, tBegin and tEnd, emulating the chopping off. As was noted above, the portion of the curve that is to be chopped off can be identified by reference to glyph dimensions or a proxy for glyph dimensions, such as the width of a selection boundary for the glyph.

Block 310 represents checking to see if there are more glyphs. If there are no more, then the method is complete at block 316. If there are any more glyphs to be placed on the path, the method advances to the next glyph as shown at 312 and accesses the curve at 304. Note that this is the remaining portion of the curve after the portion at which a glyph was placed in the previous iteration was "chopped off. Thus, the "beginning" of the curve for placement purposes is now just after the location of the last-placed glyph. Placement can continue until all glyphs are placed (finishing at block 316) or until a glyph is reached for which placement is unsuccessful; in the latter case the exit point is at block 314 as noted above.

An exit with glyphs remaining may be interpreted as a failure of the text placement algorithm that can trigger different responses in different environments or implementations. For example, the user may be presented the option to drop some of the glyphs or glyphs may be dropped automatically. For instance, the text engine may drop glyphs so that only whole words or lines are placed on the curve. Alternatively, the user may be presented the option to change the glyph characteristics (font, size, etc.).

Just like handling bidirectional text, centering or justifying text positioned glyph-by-glyph on a case-by-case basis may require more complex treatment than centering or justifying text comprising glyphs returned from a single call to the text engine for composition on a straight line. In the latter case, the centering/justifying issues can typically be handled by the text engine. When positioning glyphs on a glyph-by-glyph basis within the placeLeft/placeRight framework, the text placement algorithm can include additional features for handling centering/justification, if this is to be supported. The treatment of these tasks can be complex due to an inherent conflict between the placeLeft/placeRight framework, which works starting from an end of the path, and the task of alignment/justification considering the path as a whole.

In some embodiments, centering is based on defining a "centering point" on the path. The centering point represents a position at which, if text is placed starting at that point, the text appears centered on the path. For example, for left-to-right text, when all glyphs are placed on the path starting at and to the right of the centering point (and left-aligned relative to the centering point), the result is two remaining pieces of the path (the prefix to the left of the centering point and the suffix to the right of the last-placed glyph) having approximately the same arc length. For right-to-left text, when all glyphs are placed on the path starting at and to the left of the centering point (and right-aligned relative to the centering point), the remaining two pieces of the path (the prefix to the right of the centering point and to the left of the last placed glyph) have approximately the same arc length.

To achieve this, an iterative method for searching for a better centering point can be performed that improves the current solution at every step seeking to minimize the ratio of the arc lengths of the prefix and the suffix remaining after placing the text using a centering point under consideration. This can be a simple binary search for a starting T-value (or the arc-length of the prefix before the centered text). The search may use/consider the ratio between the lengths of the prefix and suffix at the previous iteration to produce a better centering point for the next iteration. In some embodiments, arc length, and not curvature-adjusted (i.e., generalized) arc length, is used. Since the quality of a text appearing to be visually centered on a path is determined by the visual perception of the unoccupied prefix and suffix at the ends of the path (i.e., if the text is centered, the prefix and suffix should appear equal), it is reasonable to use regular arc-length since human beings presumably do not directly perceive curvature-adjusted arc length.

Justification and other alignment tasks can be handled in a similar manner, i.e., by using an appropriate iterative search technique. For example, in some embodiments text is justified by augmenting whitespace. Specifically, all whitespace in the text can be considered and augmented, enlarged, or followed by with a fixed amount of extra arc length or extra curvature-adjusted arc length added after each whitespace. The fixed amount can be varied in iterations until the text occupies nearly all of the curve, which is expected to make the text look justified.

The notions of left-, right-alignment, centering and justification for text on a path when handled as noted above can somewhat diverge from the corresponding notions for text on a line. However, users may naturally expect bidirectional symmetry, i.e., they may expect that when a text fits on a curve when it is left-aligned, it will also fit when it is right-aligned. To account for this and similar naturally expected properties, a text placement algorithm can be implemented to ensure that if a sequence of glyphs fits on the curve using placeLeft (when called sequentially), then the sequence of glyphs will also fit using placeRight (when called sequentially, in the opposite order). This is presupposed, for example, in bidirectional text placement algorithms such as the example shown in FIG. 5 below in which glyphs placed in one direction are later placed in the opposite direction (e.g., when glyphs are initially placed using right-to-left placement and then repositioned using left-to-right placement).

Bidirectional symmetry may not be the case in all implementations—for example, if an implementation supports "negative" arc lengths (i.e. curvature-adjusted or otherwise adjusted arc lengths), a letter that starts later on the path could end earlier on the path. It is expected that these effects will not be noticeable in everyday use outside a systematic experimentation with many paths and texts and/or will not cause worse appearance of text on a path. Thus, one possibility is to ignore these considerations, i.e. to assume that for practical purposes, the property that if a sequence of glyphs fits with placeLeft, then it fits with placeRight (sequentially, opposite order) is true, even if it technically is not. As an alternative to assuming that a sequence of glyphs will fit regardless of direction, a bidirectional text placement algorithm can be implemented to determine an arbitrary number of glyphs to be placed on the curve and make several attempts to maximize this number while ensuring that the glyphs do fit on the curve, using a binary search or other technique.

Figure 4A:
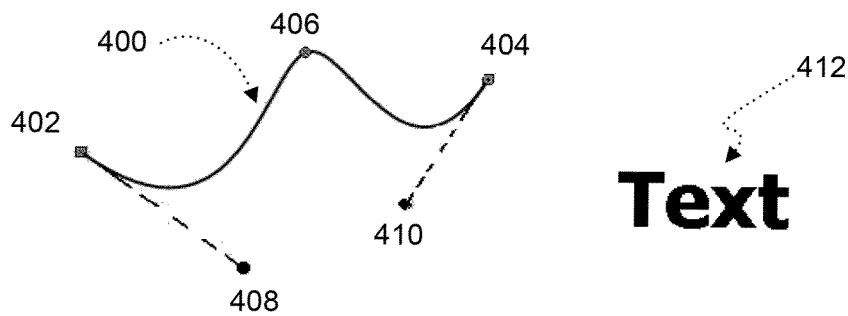
FIGS. 4A-4E illustrate an example of positioning glyphs on a path.

FIGS. 4A-4E are diagrams representing placement of text on a path 400. In this example, the path extends from endpoints 402 to 404 with a midpoint 406. As shown in FIG. 4A, path 400 can be expressed as a Bezier curve by reference to additional points 408 and 410. In this example, a single left-to-right word "Text" will be placed from the leftmost portion of path 400 (i.e. starting at 402) using placeLeft( ).

Figure 4B:
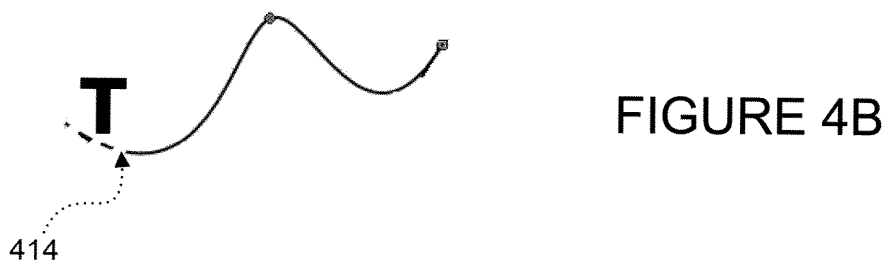
Figure 4C:
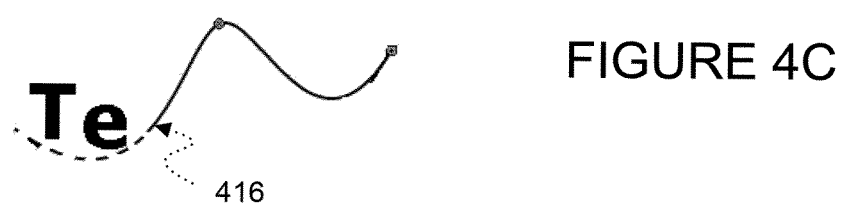
Figure 4D:
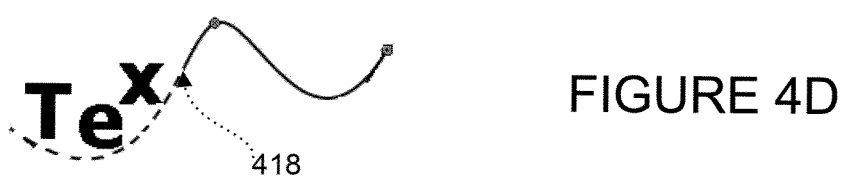
Figure 4E:
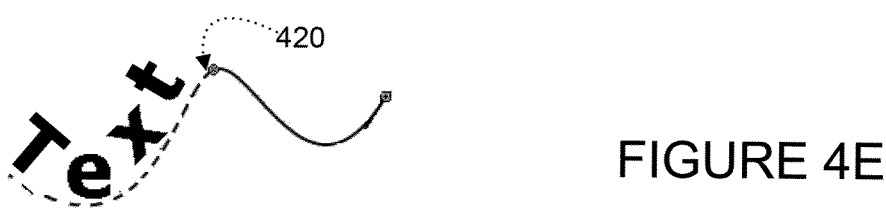

FIG. 4B illustrates placement of the first glyph "T." As indicated at 414, the path is truncated to begin after the position of "T." The original extent (i.e. pre-truncation extent) of path 400 is indicated using dashed lines for reference in this example. FIG. 4C represents the next iteration in which the following glyph "e" is placed on the path and then the path is again truncated to begin at 416. In FIG. 4D, the next glyph "x" has been placed and the path chopped to begin at 418. FIG. 4E represents placement of the final glyph "t" and truncation of the path to begin at 420; additionally, the glyphs in FIG. 4E have been rotated to be tangent to path 400.

In this example, the glyphs are rotated so that the bottom of each glyph is tangent to path 400. Some embodiments support rotating glyphs in other ways—for example, the glyphs could be rotated so that each glyph's left side, right side, or top side is tangent to path 400. As another example, the base or other side of a glyph could be rotated to a specified angle from a line tangent to path 400.

Addressing Bidirectional Text Issues

Some embodiments can support bidirectional text. Typically, bidirectional text is handled by means of a special indicator called the "embedding level" or "bidirectional embedding level" of a character and specifying, in particular, whether this character is in a portion of the text that goes left-to-right or right-to-left. For instance, in the Flash Text Engine, even numbered bidirectional embedding levels correspond to left-to-right text while odd-numbered levels correspond to right-to-left text. These numbers allow one to reconstruct the order in which text should be read (i.e. the permutation of the characters whereby they are brought from display order to the logical order). If not stored with the text, bidirectional embedding levels can be identified using the "Unicode Bidirectional Algorithm" that can determine the levels using common-sense analysis. The "Unicode Bidirectional Algorithm" can, of course, be implemented as part of the text engine.

It was noted above that in the framework of placeLeft and placeRight bidirectional text is not automatically handled by the text engine. Therefore, if it is to be supported, a bidirectional text algorithm should be provided. To illustrate potential difficulties arising from placing bidirectional text on a path glyph-by-glyph on a case-by-case basis consider the following hypothetical example. Let "a b c d 3 2 1 e f" be a text, where "3 2 1" is a right-to-left text in Arabic or another language whose logical order (reading order) is right-to-left. There are nine words in this text; for ease of explanation, all words consist of a single glyph in this example. Spaces are also omitted from the discussion, again for simplicity. As mentioned above, the text engine may return the words in logical order, not the order in which the words are displayed. This may happen, for example, because the text engine may only be able to produce a glyph corresponding to a whole line of text. In such a scenario, the easiest way to break the text into individual glyphs with each glyph representing a single letter may comprise breaking the text into single-word or single-letter lines, naturally producing the output in the logical order. In this example, the placement engine will receive the words in the following order: first "a", then "b", then "c", then "d", then "1", then "2", then "3", then "e", then "f".

If the text placement algorithm just places these words sequentially (in visual order) using placeLeft (typically placeLeft works with one glyph, but here we assumed that each word is just one glyph), it will first place "a" in the beginning of the path. Then "b", to yield "a b". Then "c", to yield "a b c". Then "d", to yield "a b c d."

The text placement algorithm may recognize that "1," "2," and "3" are right-to-left, and thus the next word to be displayed in visual order is "3." Accordingly, the next word placed on the path will be "3", so we have "a b c d 3." If the path continues, then the sequence of words will be placed properly. However, if the path ends before all words can be placed, the resulting text on the path will be "a b c d 3", which does not make sense semantically. There are two words ("1" and "2") missing between "d" and "3".

Since the glyphs are positioned on a case-by-case basis rather than by a single call to a text engine, it is clear that the text placement algorithm is to take care of the bidirectional text on its own, if bidirectional text is to be supported. Accordingly, in some embodiments, when considering bidirectional text, a "bidirectional text placement algorithm"—a text placement algorithm adapted for bidirectional text—is used so that placeLeft( ) or placeRight( ) is not simply called sequentially. As illustrated by the above example, if placeLeft were to be called sequentially in a case where the curve is too short, the algorithm would have to stop at a place where the resulting text may not make any sense (from a logical point of view).

Instead, the placement algorithm can be executed recursively, where the recursion is on the bidirectional embedding level. Each time a change in direction is encountered while placing glyphs on a segment (with the segment corresponding to the curve or a portion thereof), the algorithm either (a) moves down into another level of recursion using the remaining part of the segment and placing glyphs starting from the opposite end of the remaining part of the segment or (b) moves up to a previous level of recursion (or out of the recursion entirely) by re-positioning glyphs in visual order starting from the point on the remaining part of the segment where glyphs were last placed in the previous level of recursion. The recursion(s) end when a new glyph of a lower bidirectional embedding level lower than that of the current glyph is encountered, when the remaining portion of the path is too short to accommodate the current glyph, or when no more glyphs remain (i.e., when all glyphs have been placed).

Figure 5:
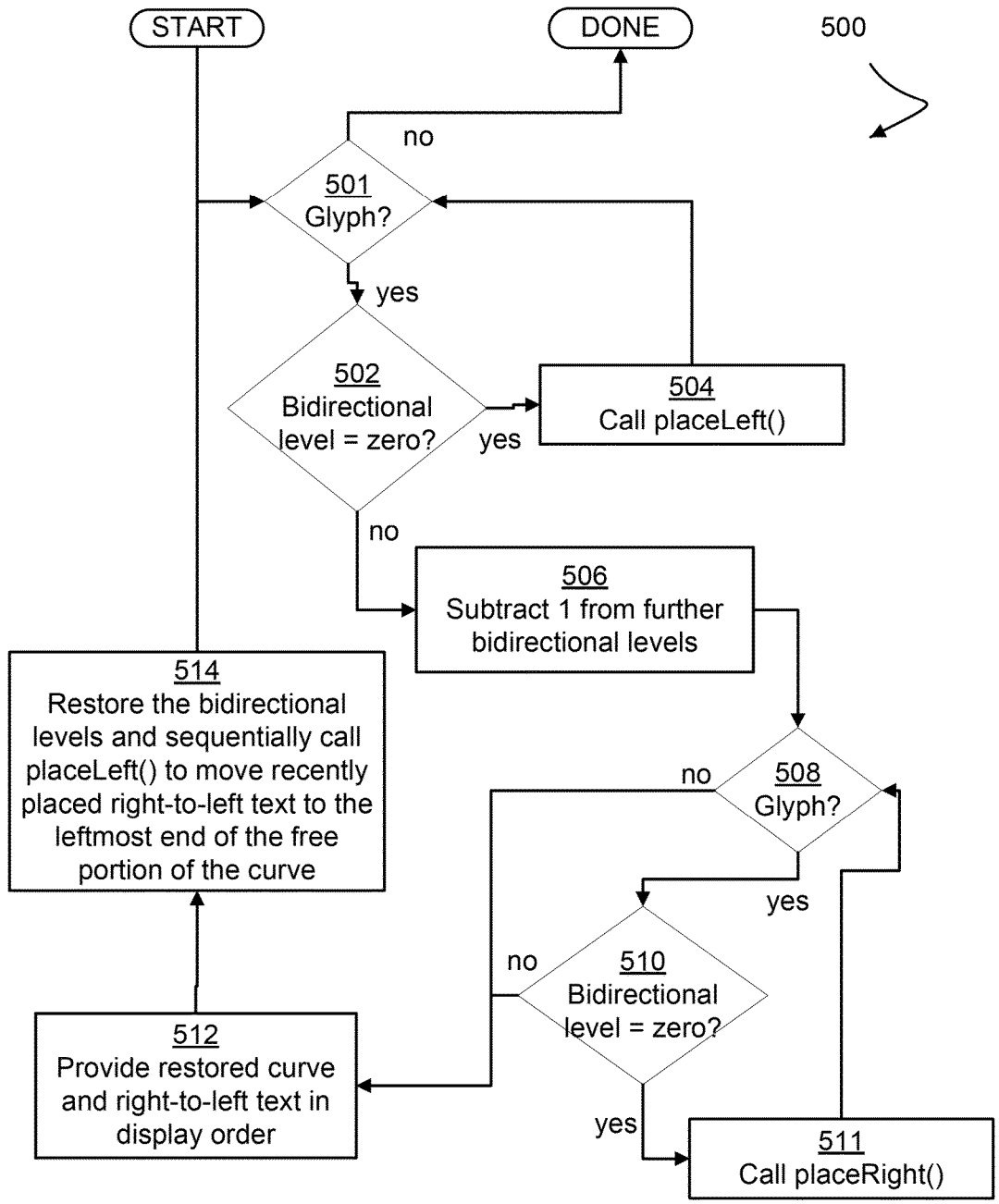
FIG. 5 is a flowchart illustrating an example of placing embedded bidirectional text using a single level of recursion.

In the example of FIG. 5, the algorithm begins at 501 to determine if a glyph is to be placed. If not, (or if some other reason for not placing a glyph is encountered) then the algorithm ends. At block 502, the algorithm determines if the bidirectional embedding level is equal to zero; a bidirectional level of zero in this example corresponds to left-to-right text. For instance, when the encountered glyphs have bidirectional embedding level zero, placeLeft( ) can be called and pieces of the curve chopped off as shown at block 504.

If, at block 502, a non-zero level is encountered, the algorithm moves to block 506. For each level of recursion, the direction is reversed and glyphs are placed starting at the opposite end. In the example of FIG. 5, a single level of recursion is illustrated, effectively presupposing that the original text only had bidirectional embedding levels 0 and 1. In this example, 1 is subtracted from all further bidirectional embedding levels associated with the remainder of the text as shown at block 506. Whatever remains of the curve at that point will be considered using placeRight( ) starting at the other end with the remainder of the text. As indicated at block 508, the method checks for a glyph at 508 and whether the bidirectional embedding level is zero at 510. If so, then placeRight( ) is called as shown at 511 until another nonzero bidirectional embedding level is encountered.

In this example, in order to keep FIG. 5 concise and easy to understand, only a single level of recursion is shown. In this level, the bidirectional embedding level can be zero (0) or negative one (−1), and thus at 510 a non-zero bidirectional embedding level indicates an exit point for the recursion. More generally, a negative bidirectional embedding level would indicate an exit point for the recursion while a positive bidirectional embedding level would indicate an entry point for another level of recursion.

Upon exiting from the recursion, as shown at block 512 the curve as it was before entering the recursion is restored. At block 514, the algorithm can restore the bidirectional levels and take the glyphs that were placed during the recursive call and call placeLeft( ) for those glyphs sequentially, left-to-right, to reposition them to the left end of what is now the restored curve, chopping off appropriate prefixes of the restored curve as required.

FIG. 5 illustrates a method 500 including one level of recursion, although it will be understood that a text placement engine can be configured to support more levels of recursion. For multiple levels of embedded bidirectional text (e.g., left-to-right text embedded in right-to-left text that is itself embedded in left-to-right text, and so on), each time a new level is reached, another level of recursion is entered and a copy of the remaining curve with its direction reversed is used in the recursion. To accommodate multiple levels of recursion, upon exit, 1 can be added to all further bidirectional embedding levels. For instance, at block 510, a positive bidirectional embedding level would indicate an entry point for the next level of recursion, while a negative bidirectional embedding level would indicate an exit point to the previous level of recursion.

The algorithm may be adapted in any suitable manner to distinguish between changes in direction due to embedded text (which would correspond to entering another level of recursion) and changes in a direction due to an end of embedded text (which would correspond to exiting the current level of recursion). In this example, 1 is subtracted from bidirectional embedding levels upon entering a level of recursion and then added upon exiting the level of recursion, but other management techniques can be used.

Continuing with the 9-word example above, first the placement engine will place "a b c d" at the beginning of the path (after the first four steps). Then it will encounter Arabic words and start putting them at the end of the path. After reaching Arabic word "1", the text as shown on the path will include "a b c d . . . <path continues> . . . 1". Then after seeing Arabic word "2" and placing it at the end of the path, the text will include "a b c d . . . <path continues> . . . 2 1". Then after getting Arabic word "3" from the text engine and placing it at the end of the path, the path will include "a b c d . . . <path continues> . . . 3 2 1". The next glyph "e" is left-to-right and signals the end of the recursion. Accordingly, the text placement engine can take "3 2 1" from the end of the path and re-position it at the beginning by calling placeLeft three times to get "a b c d 3 2 1 . . . " Then the placement engine can use placeLeft and position "e" after "1". Therefore it is clear that the text is placed correctly and the sequence of the words displayed will make sense semantically, even if the path is short and all words do not fit on it.

FIGS. 6A-6D illustrate path 400 from FIG. 4 along with a text string 602 including one left-to-right word 604 "count" and three right-to-left words 606, 608, and 610 as a quote. FIG. 6B illustrates placement of word 604 at the beginning of the path using placeLeft. As indicated, the path is truncated to begin at 612. The next word in logical order is word 606. The glyphs of word 606 are placed starting from end 404 of path 400 as shown in FIG. 6C. As indicated in FIG. 6C, the only unoccupied portion of the path extends from 612 to 616.

In this example, that portion is sufficient to place word 608, but not word 610. Accordingly, word 608 is placed using placeRight and then the glyphs of words 606 and 608 are placed using placeLeft( ) in display order so that word 608 appears next to word 604 as shown in FIG. 6D. Word 610 is not displayed due to lack of room on the path in this example, but the logical order of text string 602 is maintained nonetheless (since words 606 and 608 should be read after word 604).

Figure 6E:
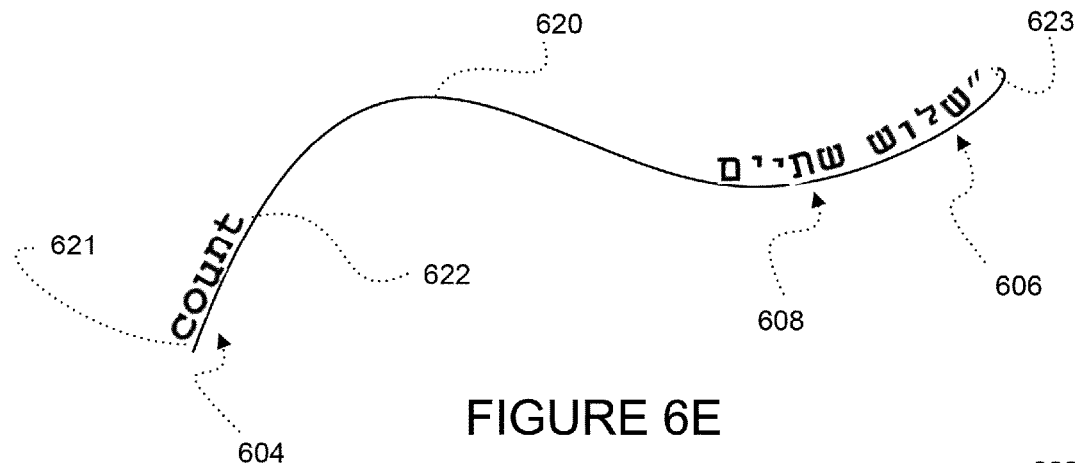
Figure 6F:
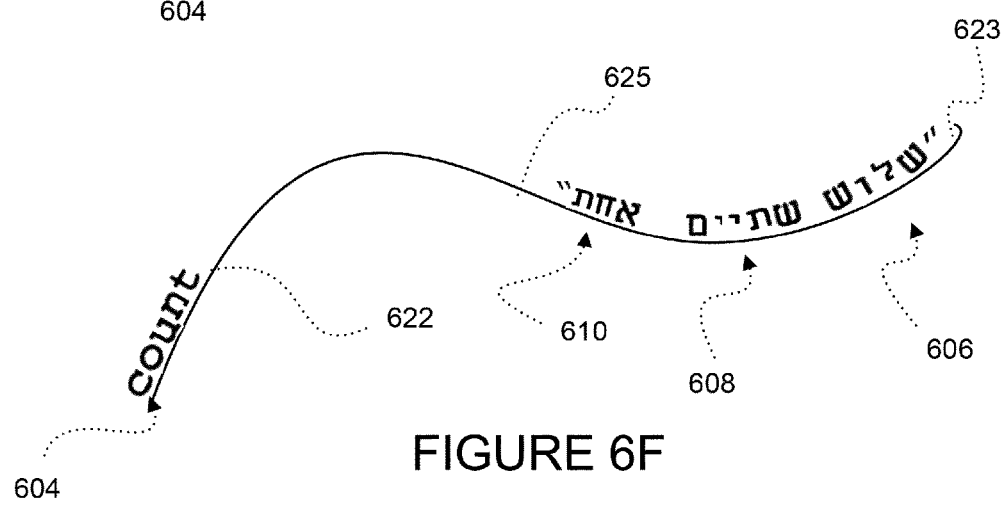
Figure 6G:
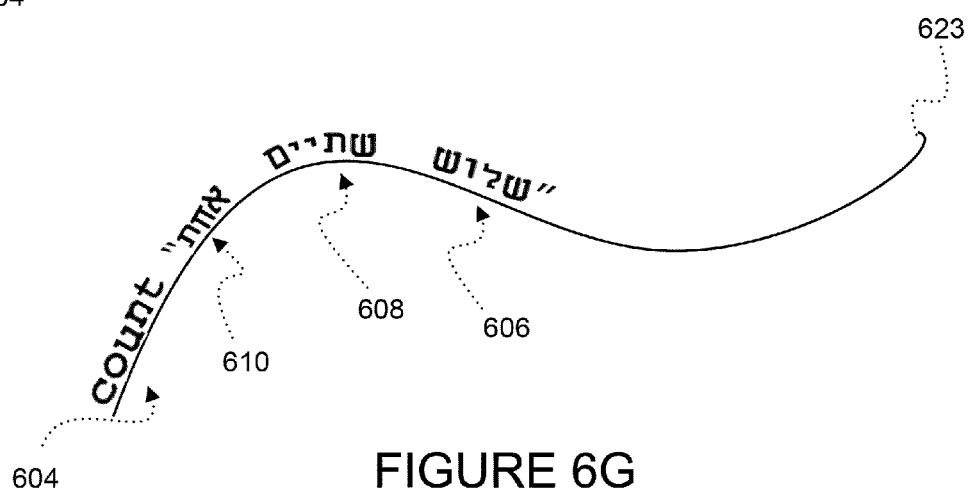

FIGS. 6E-6G illustrate a scenario with another path 620 extending from a first end 621 to a second end 623 upon which words 604, 606, 608, and 610 will be placed. In this example, there is sufficient room on the path for all glyphs (i.e. the glyphs are smaller relative to the path length or the path length is larger relative to the glyph size than in FIGS. 6A-6D). In this example, word 604 is placed using placeLeft starting from end 621. When the right-to-left glyphs are reached, the segment of the path from 622 to 623 goes into recursion and the glyphs of words 606 and 608 are placed using placeRight and starting from end 623. As shown in FIG. 6F, words 606, 608, and 610 extend from end 622 to point 625 and there is space remaining on the path from 625 to 622. Thus, when the recursion exits (since no more glyphs remain), placeLeft is called on the glyphs in display order starting from 622.

FIGS. 6A-6G and the simplified one-glyph-per-word example earlier above used only two bi-directional levels, "0" (of the left-to-right text) and "1" (of the Arabic or Hebrew words). Therefore, for handling only two bidirectional levels it was sufficient to use one level of recursion. If there were some left-to-right text within the right-to-left text (say, English followed by an Arabic section that is itself quoting English), a recursive bidirectional text placement algorithm could be used, such as the modification presented above. To illustrate how such a modified algorithm would proceed, assume a quote having the words "a b c 4 3 e f 2 1" in visual order from left-to-right. The logical order for the quote would be "a b c" followed by "1 2" "e f" and then "3 4." (Assume that, in this example, letters again represent words in English while numbers represent words in Arabic).

The embedded left-to-right quote ("e f") would have a bidirectional embedding level of 2, prior to adjustments made during execution of the bidirectional text placement algorithm. For instance, the text placement engine could place words left-to-right until the first Arabic words ("1" and "2" in logical order) were reached, at which it would enter a first level of recursion and then place those words using placeRight. At that point, the text on the path would include "a b c . . . <path continues> . . . 2 1," if returned without completion or adjustment—i.e., if the algorithm were frozen and the glyphs viewed as positioned at the point at which the algorithm were frozen.

When the embedded quote is reached, a second level of recursion is entered in which the text placement engine stops placing words using placeRight at the end of the curve and starts placing them again at the beginning using placeLeft. Note that the words would be placed at the beginning of the portion of the curve that is in the recursion. At that point, the text on the path (if returned without completion or adjustment) would include "a b c e f . . . <path continues> . . . 2 1." The portion in the second level of recursion would include "e f<path continues>"

Once the embedded quote is placed, the glyphs of the embedded quote are repositioned by calling placeRight several times on the words in reverse display order. At that point, the text on the path (if returned without completion or adjustment) would include "a b c <path continues> . . . e f 2 1." Then, the remaining Arabic text would be iteratively placed at the end of the curve using placeRight( ) to yield "a b c . . . <path continues> . . . 3 e f 2 1" and then "a b c . . . <path continues>. 0.4 3 e f 2 1"

After all Arabic is completed and the first level of recursion is exited, the text placement engine would reposition everything at the end to the beginning of the remaining part of the curve by calling placeLeft several times to yield "a b c 4 3 e f 2 1<path continues>" Thus, words from bi-directional level 2 ("e f") were placed three times: first using placeLeft at the deepest (second) level of recursion, then repositioned using placeRight at the first level of recursion, then again repositioned to the left using placeLeft at the zero level of recursion, after exiting all recursive calls.

Figure 7A:
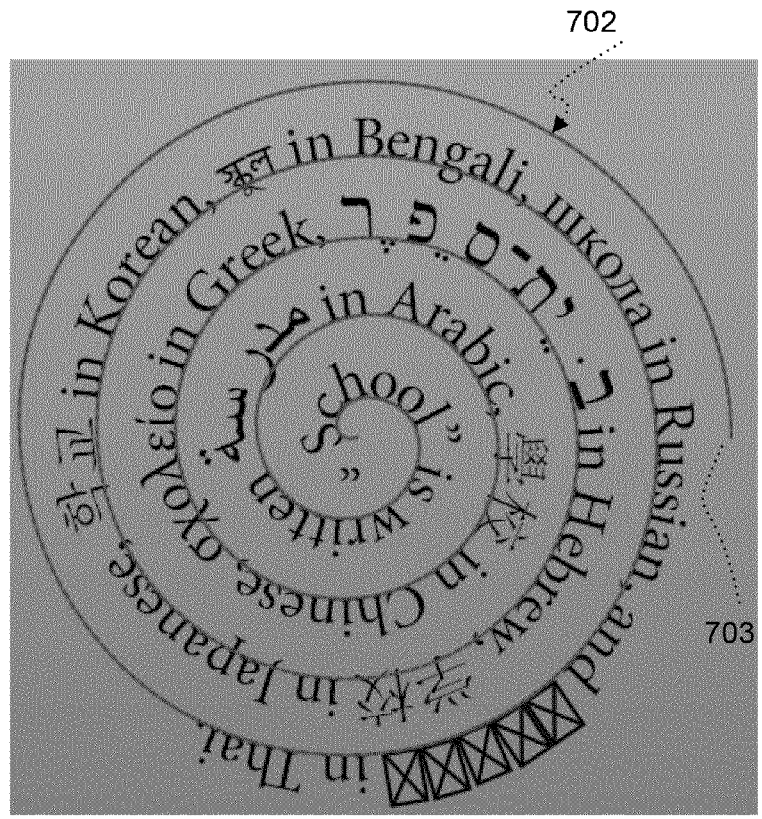
FIGS. 7A-7D illustrate additional examples of text on a path.

FIGS. 7A through 7D illustrate several examples of text on a path. For example, FIG. 7A illustrates text on a spiral path 702 beginning at the center and extending to an endpoint 703. Text is expressed in several different languages, including English, Arabic, Japanese, Korean, Hebrew, Russian, Chinese, Greek, and others.

Figure 7B:
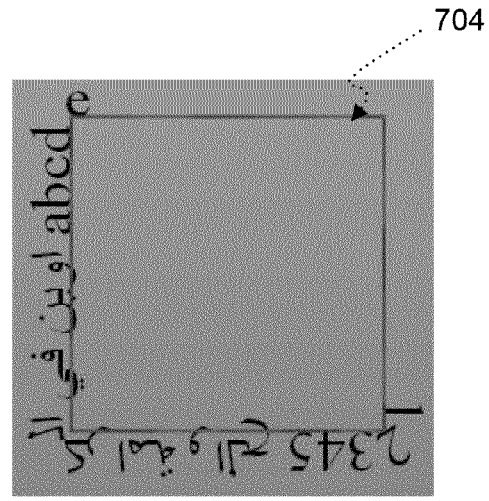

FIG. 7B shows text following a square path 704. In this example, the bottom of each glyph is positioned along the path, with the result that a portion is upside-down while another portion is sideways. This example also includes a mix of English language and Arabic characters. Notice that the digit "2" is not aligned along the tangent line. This represents a feature or optimization to achieve a smooth rotation from glyph "1" to "2" to "3." Also, although in this example, the curve is closed (a square), technically/internally (i.e. from the point of view of a text placement algorithm) it has a beginning and an end.

Figure 7C:
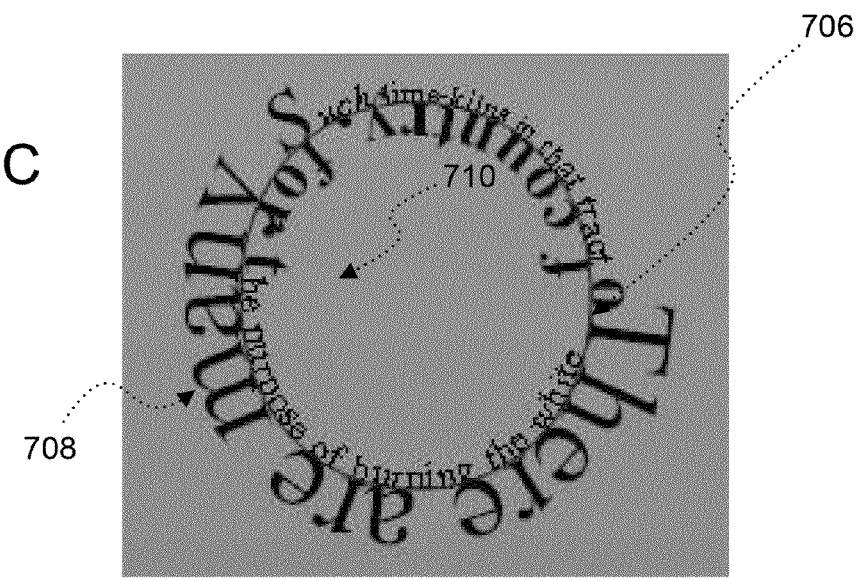

FIG. 7C illustrates an example of text in two directions. In this example, path 706 is circular. Text 708 on the outside of the circle extends in a clockwise direction, while text 710 on the inside of the circle extends in a counterclockwise direction. Note also that the font size varies throughout the text. This illustrates the flexibility of algorithms based on the placeLeft/placeRight framework allowing for individual treatment of glyphs on a case-by-case basis, and thereby taking into account the size of individual glyphs. Text 708 is on a "convex" path while text 710 is on a "concave" path.

Figure 7D:
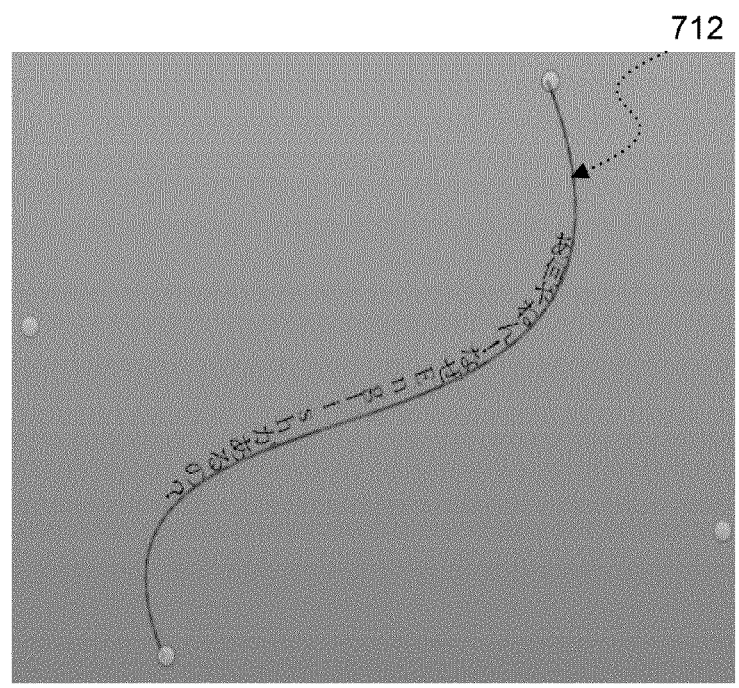

FIG. 7D illustrates text arranged along path 712. In this example, the text comprises Japanese characters and English-language characters. Also, the glyphs of this example have been rotated so that a side (rather than the top or bottom) of each glyph follows path 712. Thus, the text may be considered "vertical," at least for those portions of path 712 that are vertical.

Additional details for certain implementations of the present subject matter will be discussed below. However, it should be clear from the foregoing that use of the present subject matter allows for text with a mixture of fonts (including different font sizes) and even inline images, which can be treated as glyphs. In contrast to certain previous approaches that identify one font size and use it for the whole text, use of placeLeft and placeRight may be more flexible as they work with individual glyphs on a case-by-case basis.

Optimizations and adjustments are possible. For instance, if a path starts with a very small concave hook (or spiral), then after the text has been placed on a path, some distance can lie between the actual path beginning and the point at which the text starts. For example, if the path has a concave hook at the beginning (i.e. where the left-to-right text will start), the text placement engine can move the text somewhat to the right as the concave hook may have negative curvature-adjusted arc length. If the path starts with a very small convex hook (or a small spiral) relative to the text size, this will not happen. An adjustment is to detect but ignore the hook or spiral if it is small and concave so that text is not moved without any apparent reason to the user.

In addition to the advantages in improved placement of text on a path, use of an approach in accordance with the present subject matter may also be conceptually cleaner and thus easier to analyze, optimize and use as a basis for future improvements. For example, if the text engine 124 is improved to provide different APIs or capabilities, the text-to-path algorithm can be easily updated. For instance, if text placement engine 126 is implemented as a class BaseComposeTextOnPath, then a different implementation of the placeLeft and placeRight methods can be implemented to support and/or take advantage of the new API for text engine 124. For example, if the text engine 124 were updated to include APIs providing actual glyph outlines (rather than only the selection bounds for the glyphs), then the text placement engine 126 can be updated to request and use actual dimensions of one or more glyphs rather than their selection bounds to achieve a higher-quality result. This can be done in some implementations by appropriately implementing placeLeft/placeRight methods in a child class inheriting from BaseComposeTextOnPath.

Below, certain exemplary implementation aspects will be discussed in closer detail. It should be noted that these are for example only and many possible implementations are possible based on the teachings herein.

Bezier Curves: Implementation Details

In some embodiments, a cubic Bezier segment can be represented by an instance of the class CubicBezierSegment. This is what is typically called a cubic Bezier curve, it is just convenient to call it a Bezier segment. A cubic Bezier segment is specified by four points: two anchor points and two control points. There are many references on this topic.

If four points p0, p1, p2, p3 are known (p0 and p3 are two anchor points, i.e. the ends of the Bezier segment, while p1 and p2 are two control points), then it is easy to create a segment by calling the constructor and specifying these four points:

var p0, p1, p2, p3: Point;
. . .
var seg:CubicBezierSegment=new CubicBezierSegment (p0, p1, p2, p3);

A path is a sequence of cubic Bezier segments. In this text, the entire path is referred to as a "Bezier curve," and refers to a sequence of Bezier segments. For example, in software, a Bezier curve can be represented by an instance of the class CubicBezier. Basically, this class is just maintaining an array protected var segments: Vector.<CubicBezierSegment>;
and forwarding all the operations to the appropriate cubic Bezier segment(s). To construct a curve, call the constructor without parameters and then call appendSegment consecutively. The segments do not have to form a continuous curve (their ends need not coincide). No such check is performed, and this is done on purpose (it is sometimes very convenient).

Parameterization

A cubic Bezier segment is parameterized by one number that varies from 0 to 1. (Of course, 0 corresponds to the first anchor point, while 1 corresponds to the last anchor point.) The equation is $B(t)=(1-t)^3 P_0 + 3t(1-t)^2 P_1 + 3t^2(1-t)P_2 + t^3 P_3$ The class CubicBezierSegment can have a function pointAtT( ) that does just that: takes a T-value and returns a point. If the T-value is not within [0, 1], the function may throw an exception. In some implementations, the function uses an explicit formula and has no parameters controlling precision.

A cubic Bezier curve (a sequence of cubic Bezier segments) is parameterized by gluing together the parameterizations of individual segments. For example, if the curve consists of 3 segments, then it will be parameterized by T-values ranging from 0 to 3. Then the T-values from 0 to 1 correspond to points in the first cubic Bezier segment, the T-values ranging from 1 to 2 correspond to points in the second cubic Bezier segments, and lastly the T-values ranging from 2 to 3 correspond to points in the third cubic Bezier segment.

If the curve is not continuous (the endpoints do not match), then the points for integer T-values are not specified. Of course, if the curve is not continuous, one should be careful with numerical errors, as c.pointAtT(0.999999999) may be quite different from c.pointAtT(1.000000001). The point c.pointAtT(1.0) can be either of the two: it is not specified.

Unit Tangent Vectors

The unit tangent vector can be used in determining how a glyph is to be positioned relative to the path. For example, the top, bottom, or side of a glyph can be positioned parallel to the tangent line at its location on the path, with the unit tangent vector used to achieve that in practice.

One may retrieve the tangent unit vector of a cubic Bezier segment at any of its internal points. Of course, the velocity (=tangent vector) may sometimes be zero for a degenerate segment, e.g., the tangent vector at P1 when P0==P3 and P1==P2 so that it cannot be normalized to a unit vector. In this case it may be left to be zero. The tangent unit vector at an endpoint can be found by taking the limit. Equivalently, it is possible to consider the cubic Bezier segment as a part of the curve given by the same equation, but treated for all T-values, not just from 0 to 1. The tangent unit vector can be found at any point: just differentiate the equation and normalize the result.

Some implementations may replace any T-value smaller than 0.01 by 0.01 and any T-value greater than 0.99 by 0.99. This may be needed for legacy reasons, for instance. As an alternative, one can use a more straightforward formula (coming from simply taking the derivative), rather than relying on De Casteljau's algorithm. The CubicBezier class can have the corresponding function tangentUnitVectorAtT that accepts a T-value between zero and the maximum T-value, that is the total number of Bezier segments in the Bezier curve. The issues with supplying an integer T-value are ignored (resolved arbitrarily).

Subdividing and Truncating

Segments can be subdivided in order to "discard" occupied portions of the path to define a new "beginning" of the curve for placement of the next glyph.

A cubic Bezier segment can be subdivided at any T-value from 0 to 1 into two smaller cubic Bezier segments. One exemplary way of doing so relies on the De Casteljau's algorithm. The T-values are combined multiplicatively. (e.g. if one subdivides at T=0.3 and query the first segment for T=0.2, the result is the point that was originally at T=0.06. If one queries the second segment for T=0.2, the result is the point that was originally at T=0.44=0.3+0.2*(1−0.3)=1−(1−0.2)*(1−0.3).) Such manipulation of cubic Beziers should be known to one of skill in the art.

In some embodiments, the CubicBezierSegment class can have the methods: truncateTheSuffix(tValue) that subdivides the cubic Bezier segment at tValue and leaves only the first part, truncateThePrefix(tValue) that does just the opposite. It also can have ReturnSuffixAndTrncate(tValue) that is very much like truncateTheSuffix(tValue), but it also returns the suffix (the second part) as a return value of the function. truncateThePrefix again does just the opposite. If you specify 0 or 1 as a tValue, nothing will happen or one of the segments will end up being degenerate (with P0==P1==P2==P3).

These methods can be used to accordingly remove segments of the path during the glyph positioning determination noted above.

The CubicBezier class can have the same methods with the same semantics. If it leads to a degenerate curve, it is guaranteed that this curve will have at least one segment (although, a degenerate one). Cubic Beziers with no segments are not allowed.

An additional embodiment can include a method that comprises CubicBezier.subcurveByBounds that accepts two tValues, tBegin and tEnd and truncates both the corresponding prefix and the corresponding suffix. Such an embodiment assumes that tBegin ≤tEnd.

Optimization Remark

In some implementations, it is may be possible to clone a cubic Bezier, truncate the cloned copy, and then return to the original copy and clone it again, if necessary. This approach may not be the best idea if performance is an issue. Thus, optimizations may be performed if necessary.

For example, one solution is to add two private variables to the CubicBezier class: tStart and tEnd. Then instead of truncating the curve (with actually removing cubic Bezier segments from the array and throwing them away to be picked up during garbage collection) one could simply re-set the variables tStart and tEnd. Other functions such as pointAtT would only require minor changes. Then it would be easy to e.g. remember the state of a cubic Bezier, truncate it several times, and then come back to the previous state. One can even maintain a stack of the previous pairs of T-values (that may be particularly useful for the Bi-directional algorithm).

General Considerations

Some portions of the detailed description above were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing systems. Such system(s) may comprise one or more computing devices adapted or configured to perform one or more embodiments of the methods disclosed herein. The order of the blocks presented in the examples above can be varied—for example, blocks can be re-ordered, combined, and/or broken into sub-blocks. Certain blocks or processes can be performed in parallel.

As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components, including communication over a network. It should be appreciated that such network communications may occur over any suitable number or type of networks, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A method comprising:
    starting from a first end of a path, iteratively placing along the path, by a processor, each of a first subset of a plurality of glyphs in a first visual order based on determining that each of the first subset of glyphs has a first directional value indicating a first level of bidirectional embedding of the glyph, wherein the first visual order is the order in which the first subset of glyphs are displayed for reading;
    determining, by the processor, that one of a second subset of the plurality of glyphs has a second directional value indicating a second level of bidirectional embedding of the glyph;
    starting from a second end of the path that is opposite to the first end of the path, iteratively placing along the path, by the processor, each of the second subset of glyphs in a second visual order, wherein the second visual order is the order in which the second subset of glyphs are displayed for reading; and
    redetermining, by the processor, placement points for the second subset of glyphs by, starting from a start point on the path adjacent to the first subset of glyphs as placed on the path, iteratively placing the second subset of glyphs along the path such that the second visual order of the second subset of glyphs is maintained.

2. The method of claim 1, wherein iteratively placing each glyph comprises:
    identifying a first point on the path,
    determining a path segment to be occupied by the glyph and extending from the first point of the path to a second point on the path,
    associating the glyph with a point on the path segment, and
    truncating the path by removing the path segment occupied by the glyph.

3. The method of claim 2, further comprising determining, by the processor, a line tangent to the path for each glyph and rotating each glyph relative to the line tangent to the path.

4. The method of claim 2, further comprising:
    determining, by the processor, that the path segment to be occupied by a next glyph to be placed on the path exceeds the length of the path as truncated;
    providing output indicating that text comprising the plurality of glyphs will not fit on the path.

5. The method of claim 4, wherein providing output indicating that the text will not fit on the path comprises providing an option to remove one or more glyphs for which a placement point on the path has been determined.

6. The method of claim 4, wherein providing output indicating that the text will not fit on the path comprises:
    determining a word associated with at least one glyph with a size exceeding the length of the path as truncated; and
    removing all glyphs associated with the word from the path.

7. The method of claim 4, wherein providing output indicating that the text will not fit on the path comprises providing a visual indication that an omitted glyph has not been placed on the path.

8. The method of claim 2, further comprising providing, by the processor, output for displaying text following the path based on data describing the first subset and second subset as placed on the path.

9. The method of claim 1, wherein redetermining placement points for the second subset of glyphs eliminates whitespace adjacent to the first subset of glyphs as placed on the path.

10. The method of claim 1, wherein redetermining placement points for the second subset of glyphs is performed after iteratively placing the first subset of the plurality of glyphs in the first visual order and iteratively placing the second subset of glyphs in the second visual order starting from the second end of the path that is opposite to the first end of the path.

11. A computing platform comprising a processor with access to a computer-readable medium embodying program components, the program components comprising:
 a text engine configured to provide text data comprising a plurality of glyphs;
 a text placement engine configured to perform the operations of:
  starting from a first end of a path, iteratively placing along the path each of a first subset of the plurality of glyphs in a first visual order based on determining that each of the first subset of glyphs has a first directional value indicating a first level of bidirectional embedding of the glyph, wherein the first visual order is the order in which the first subset of glyphs are displayed for reading;
  determining that one of a second subset of the plurality of glyphs has a second directional value indicating a second level of bidirectional embedding of the glyph;
  starting from a second end of the path that is opposite to the first end of the path, iteratively placing along the path each of the second subset of glyphs in a second visual order, wherein the second visual order is the order in which the second subset of glyphs are displayed for reading; and
  redetermining placement points for the second subset of glyphs by, starting from a start point on the path adjacent to the first subset of glyphs as placed on the path, iteratively placing the second subset of glyphs along the path such that the second visual order of the second subset of glyphs is maintained.

12. The computing platform of claim 11, wherein the text placement engine is configured to perform the operation of iteratively placing each glyph by:
 identifying a first point on the path,
 determining a path segment to be occupied by the glyph and extending from the first point of the path to a second point on the path,
 associating the glyph with a point on the path segment, and
 truncating the path by removing the path segment occupied by the glyph.

13. The computing platform of claim 12, wherein the text placement engine is further configured to determine a line tangent to the path for each glyph and rotating each glyph relative to the line tangent to the path.

14. The computing platform of claim 12, wherein the text placement engine is further configured to perform operations comprising:
 determining that the path segment to be occupied by a next glyph to be placed on the path exceeds the length of the path as truncated;
 providing output indicating that text comprising the plurality of glyphs will not fit on the path.

15. The computing platform of claim 14, wherein the text placement engine is configured to provide output indicating that the text will not fit on the path by providing an option to remove one or more glyphs for which a placement point on the path has been determined.

16. The computing platform of claim 14, wherein the text placement engine is configured to provide output indicating that the text will not fit on the path by performing operations comprising:
 determining a word associated with at least one glyph with a size exceeding the length of the path as truncated; and
 removing all glyphs associated with the word from the path.

17. The computing platform of claim 14, wherein the text placement engine is configured to provide output indicating that the text will not fit on the path by providing a visual indication that an omitted glyph has not been placed on the path.

18. A non-transitory computer-readable medium tangibly embodying program code executable by a computer system, the program code comprising:
 program code for, starting from a first end of a path, iteratively placing along the path each of a first subset of a plurality of glyphs in a first visual order based on determining that each of the first subset of glyphs has a first directional value indicating a first level of bidirectional embedding of the glyph, wherein the first visual order is the order in which the first subset of glyphs are displayed for reading;
 program code for determining that one of a second subset of the plurality of glyphs has a second directional value indicating a second level of bidirectional embedding of the glyph;
 program code for, starting from a second end of the path that is opposite to the first end of the path, iteratively placing along the path each of the second subset of glyphs in a second visual order, wherein the second visual order is the order in which the second subset of glyphs are displayed for reading; and
 program code for redetermining placement points for the second subset of glyphs by, starting from a start point on the path adjacent to the first subset of glyphs as placed on the path, iteratively placing the second subset of glyphs along the path such that the second visual order of the second subset of glyphs is maintained.

19. The non-transitory computer-readable medium of claim 18, wherein the program code for iteratively placing each glyph comprises:
 program code for identifying a first point on the path,
 program code for determining a path segment to be occupied by the glyph and extending from the first point of the path to a second point on the path,
 program code for associating the glyph with a point on the path segment, and
 program code for truncating the path by removing the path segment occupied by the glyph.

20. The non-transitory computer-readable medium of claim 19, further comprising:
 program code for determining that the path segment to be occupied by a next glyph to be placed on the path exceeds the length of the path as truncated;
 program code for providing output indicating that text comprising the plurality of glyphs will not fit on the path.

21. The non-transitory computer-readable medium of claim 20, wherein the program code for providing output indicating that the text will not fit on the path comprises program code for providing an option to remove one or more glyphs for which a placement point on the path has been determined.

22. The non-transitory computer-readable medium of claim 20, wherein the program code for providing output indicating that the text will not fit on the path comprises:
    program code for determining a word associated with at least one glyph with a size exceeding the length of the path as truncated; and
    program code for removing all glyphs associated with the word from the path.

23. The non-transitory computer-readable medium of claim 20, wherein the program code for providing output indicating that the text will not fit on the path comprises program code for providing a visual indication that an omitted glyph has not been placed on the path.

\* \* \* \* \*